United States Patent
Tavildar et al.

(10) Patent No.: US 9,001,760 B2
(45) Date of Patent: Apr. 7, 2015

(54) SCHEDULING ASSIGNMENT AND ACK/NACK REPORTING TO FACILITATE CENTRALIZED D2D SCHEDULING

(71) Applicant: QUALCOMM Incorporated, San Diego, CA (US)

(72) Inventors: Saurabh R. Tavildar, Jersey City, NJ (US); Shreeshankar R. Bodas, Piscataway, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 13/628,510

(22) Filed: Sep. 27, 2012

(65) Prior Publication Data

US 2014/0086158 A1    Mar. 27, 2014

(51) Int. Cl.
*H04W 72/02*    (2009.01)
*H04L 1/16*    (2006.01)

(52) U.S. Cl.
CPC .................................. *H04L 1/1607* (2013.01)

(58) Field of Classification Search
CPC ... H04L 1/1607; H04L 1/1621; H04L 1/1628; H04L 1/1635; H04L 5/0053; H04W 4/005; H04W 72/048; H04W 84/18; H04W 84/025
USPC ................. 370/310–311, 252, 350, 328–330, 370/336–338; 455/39, 426.1, 507–509, 455/438, 450, 450.2
See application file for complete search history.

(56) References Cited

U.S. PATENT DOCUMENTS

2007/0047495 A1*    3/2007    Ji et al. .......................... 370/335
2007/0147266 A1*    6/2007    Bachl et al. ................... 370/252
(Continued)

FOREIGN PATENT DOCUMENTS

WO        2010049801 A1    5/2010
WO        WO2011106931 A1    9/2011
WO        WO2011113200 A1    9/2011

OTHER PUBLICATIONS

Seppala, et al., "Network Controlled Device-to-Device (D2D) and Cluster Multicast Concept for LTE and LTE-A Networks," IEEE Wireless Communications and Networking Conference (WCNC), Mar. 2011, pp. 986-991.
(Continued)

*Primary Examiner* — Charles C Jiang
*Assistant Examiner* — Mohamed Kamara
(74) *Attorney, Agent, or Firm* — James K. O'Hare

(57) ABSTRACT

A method, an apparatus, and a computer program product for wireless communication are provided. The apparatus receives a resource assignment from a serving base station for a device-to-device (D2D) link with a transmitter, attempts to receive a data packet from the transmitter based on the resource assignment, sends an acknowledgment (ACK) only to the serving base station when reception of the data packet succeeds, and sends a negative acknowledgment (NACK) only to the transmitter when the reception of the data packet fails. In an aspect, the apparatus receives a resource assignment from a serving base station for a D2D link with a receiver, sends a data packet to the receiver based on the resource assignment, and assumes the data packet is successfully received at the receiver unless a NACK is received from the receiver, wherein the NACK indicates a failed reception of the data packet at the receiver.

32 Claims, 18 Drawing Sheets

(56) References Cited

U.S. PATENT DOCUMENTS

| | | | |
|---|---|---|---|
| 2011/0159799 A1 | 6/2011 | Chen et al. | |
| 2012/0083283 A1 | 4/2012 | Phan et al. | |
| 2012/0106517 A1 | 5/2012 | Charbit et al. | |
| 2013/0109301 A1* | 5/2013 | Hakola et al. | 455/39 |
| 2013/0150108 A1* | 6/2013 | Yang et al. | 455/509 |
| 2013/0170414 A1* | 7/2013 | Kwon | 370/311 |
| 2013/0184024 A1* | 7/2013 | Chen et al. | 455/509 |

OTHER PUBLICATIONS

Interdigital: "D2D Communication in LTE", 3GPP Draft; R1-132188, 3RD Generation Partnership Project (3GPP), Mobile Competence Centre; 650, Route Des Lucioles; F-06921 Sophia-Antipolis Cedex; France vol. RAN WG1, No. Fukuoka, Japan; 20130520-20130524, May 11, 2013, XP050697960,.

International Search Report and Written Opinion—PCT/US2013/061684—ISA/EPO—Jan. 21, 2014.

Nokia et al: "D2D Communication without network coverage", 3GPP Draft; R1-133495, 3rd Generation Partnership Project (3GPP), Mobile Competence Centre ; 650, Route Deslucioles ; F-06921 Sophia-Antipolis Cedex ; France, vol. RAN WG1, No. Barcelona, Spain; 20130819-20130823, Aug. 10, 2013, XP050716602,.

Research in Motion UK Limited: "Discussion on control alternatives for D2D communications", 3GPP Draft; R1-132385-RIM_Discussion_on_D2D_Communications, 3RD Generation Partnership Project (3GPP), Mobile Competence Centre; 650, Route Des Lucioles ; F-06921 Sophia-Antipolis Cedex ; France, vol. RAN WG1, No. Fukuoka, Japan; 20130520-20130524, May 11, 2013, XP050698149.

* cited by examiner

SCHEDULING ASSIGNMENT AND ACK/NACK REPORTING TO FACILITATE CENTRALIZED D2D SCHEDULING

BACKGROUND

1. Field

The present disclosure relates generally to communication systems, and more particularly, to scheduling assignment and ACK/NACK reporting to facilitate centralized device-to-device (D2D) scheduling.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a resource assignment from a serving base station for a device-to-device (D2D) link with a transmitter, attempts to receive a data packet from the transmitter based on the resource assignment, sends an acknowledgment (ACK) only to the serving base station when reception of the data packet succeeds, and sends a negative acknowledgment (NACK) only to the transmitter when the reception of the data packet fails.

In another aspect of the disclosure, the apparatus receives a resource assignment from a serving base station for a D2D link with a receiver, sends a data packet to the receiver based on the resource assignment, and assumes the data packet is successfully received at the receiver unless a NACK is received from the receiver, wherein the NACK indicates a failed reception of the data packet at the receiver.

In a further aspect of the disclosure, the apparatus sends a resource assignment to a receiver for a D2D link between the receiver and a transmitter, assumes a data packet sent from the transmitter is unsuccessfully received at the receiver unless an ACK is received from the receiver, wherein the ACK indicates a successful reception of the data packet at the receiver, receives the ACK from the receiver, and communicates the ACK to a serving base station of the transmitter via an X2 backhaul when the ACK is received from the receiver.

In yet another aspect of the disclosure, the apparatus sends a resource assignment to a transmitter for a D2D link between the transmitter and a receiver, assumes a data packet sent from the transmitter is unsuccessfully received at the receiver unless an ACK is received from a serving base station of the receiver, wherein the ACK indicates a successful reception of the data packet at the receiver, and receives the ACK from the serving base station of the receiver via an X2 backhaul.

DETAILED DESCRIPTION

Figure 1:
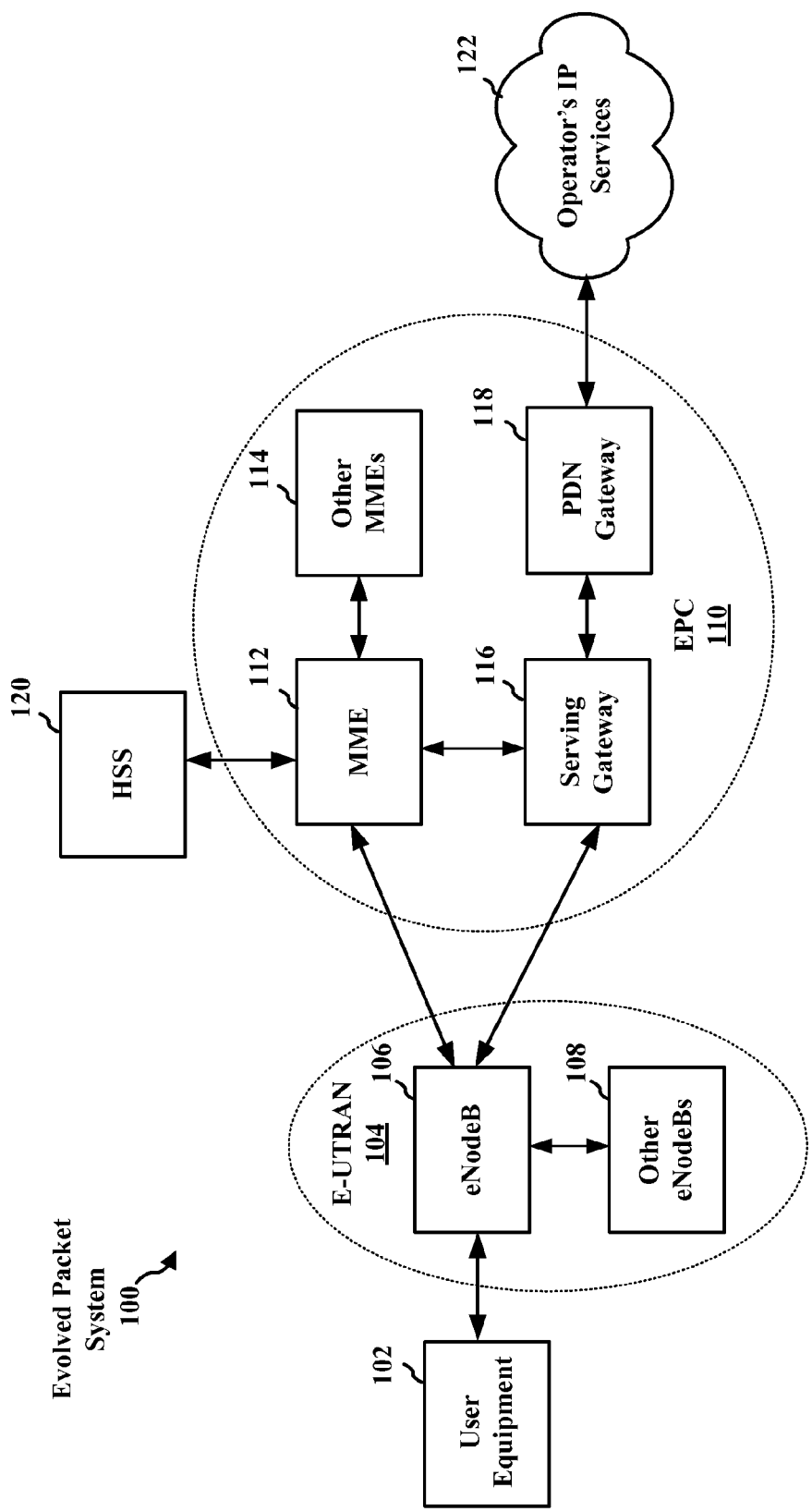
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
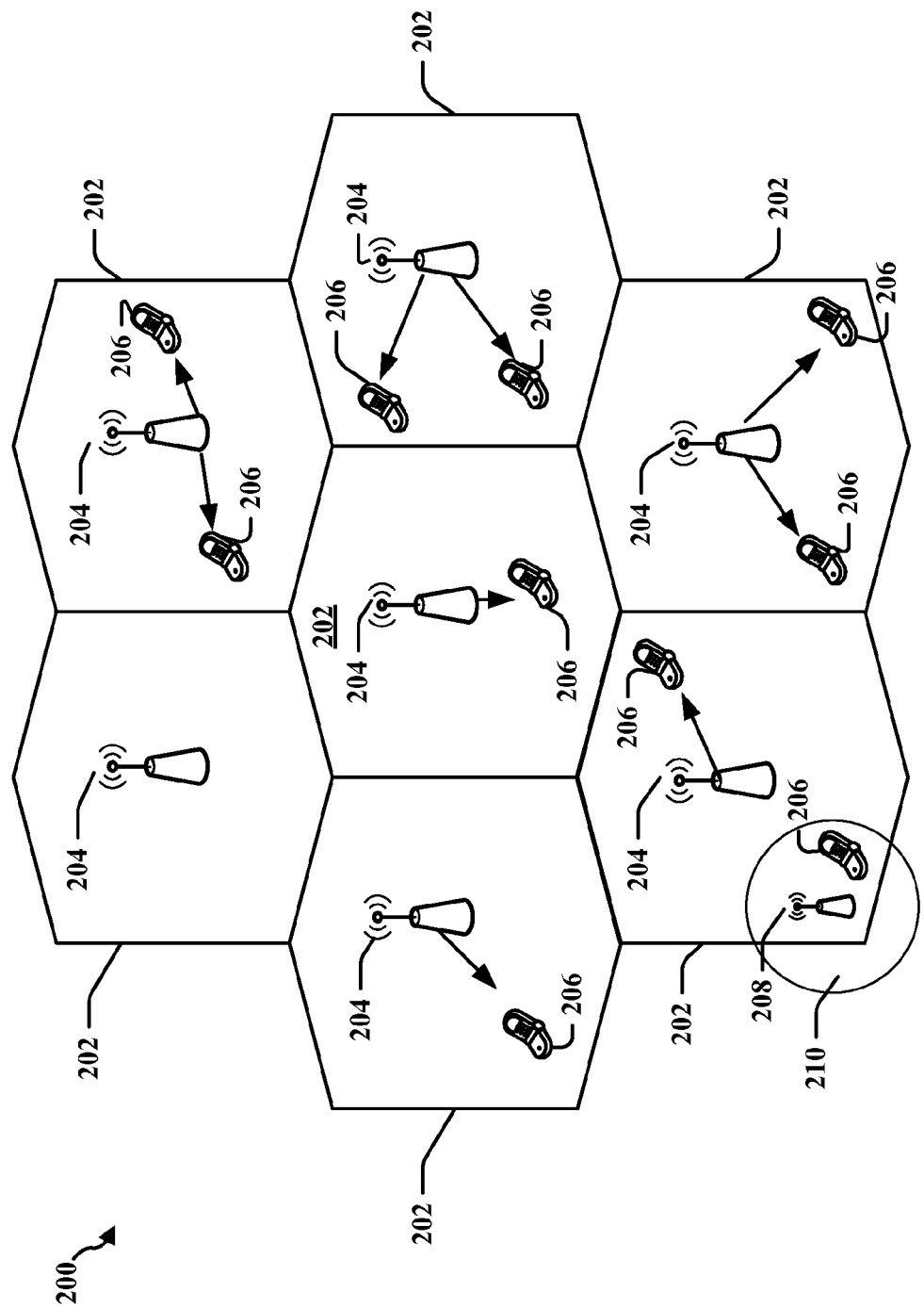
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
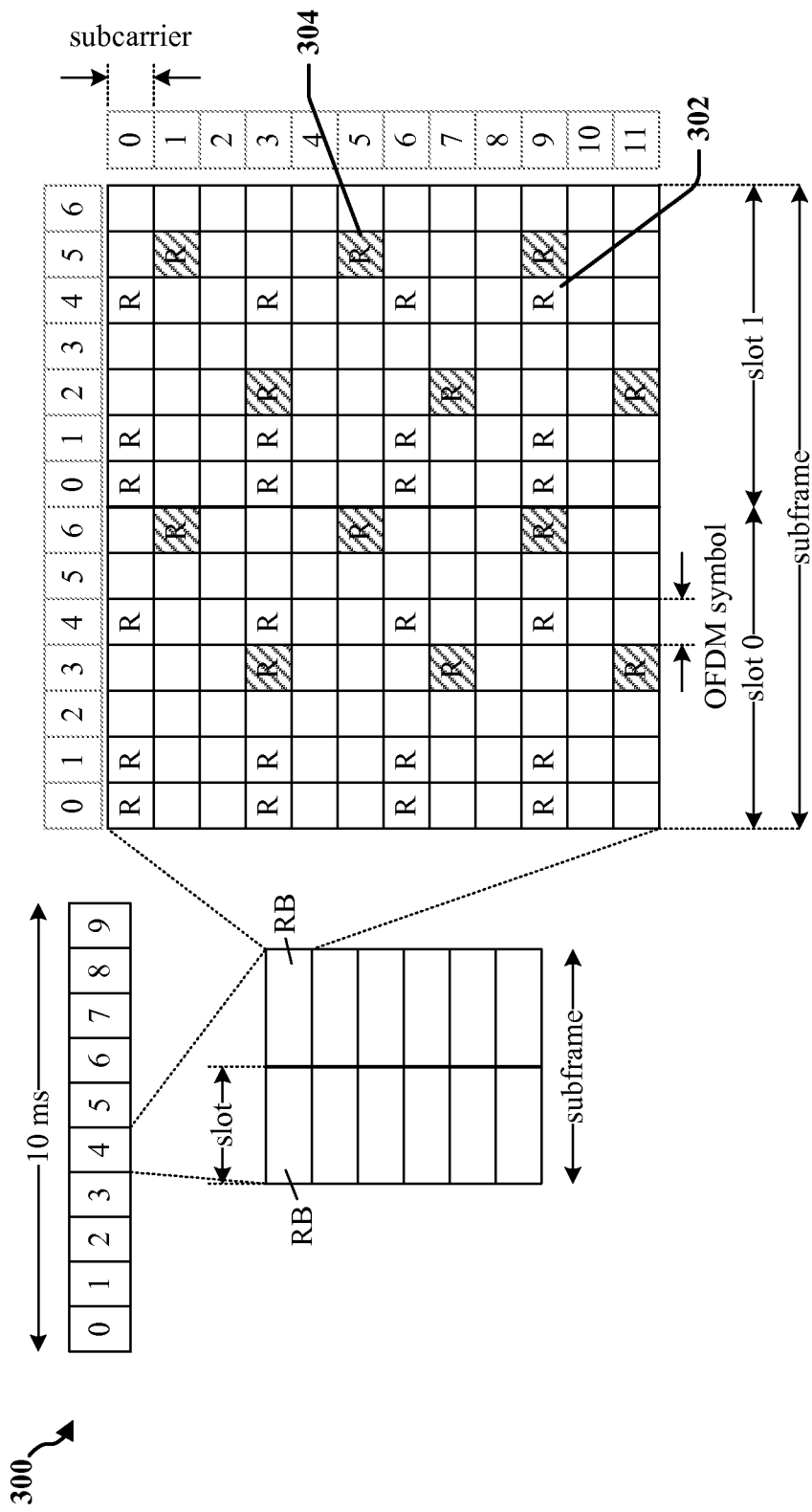
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
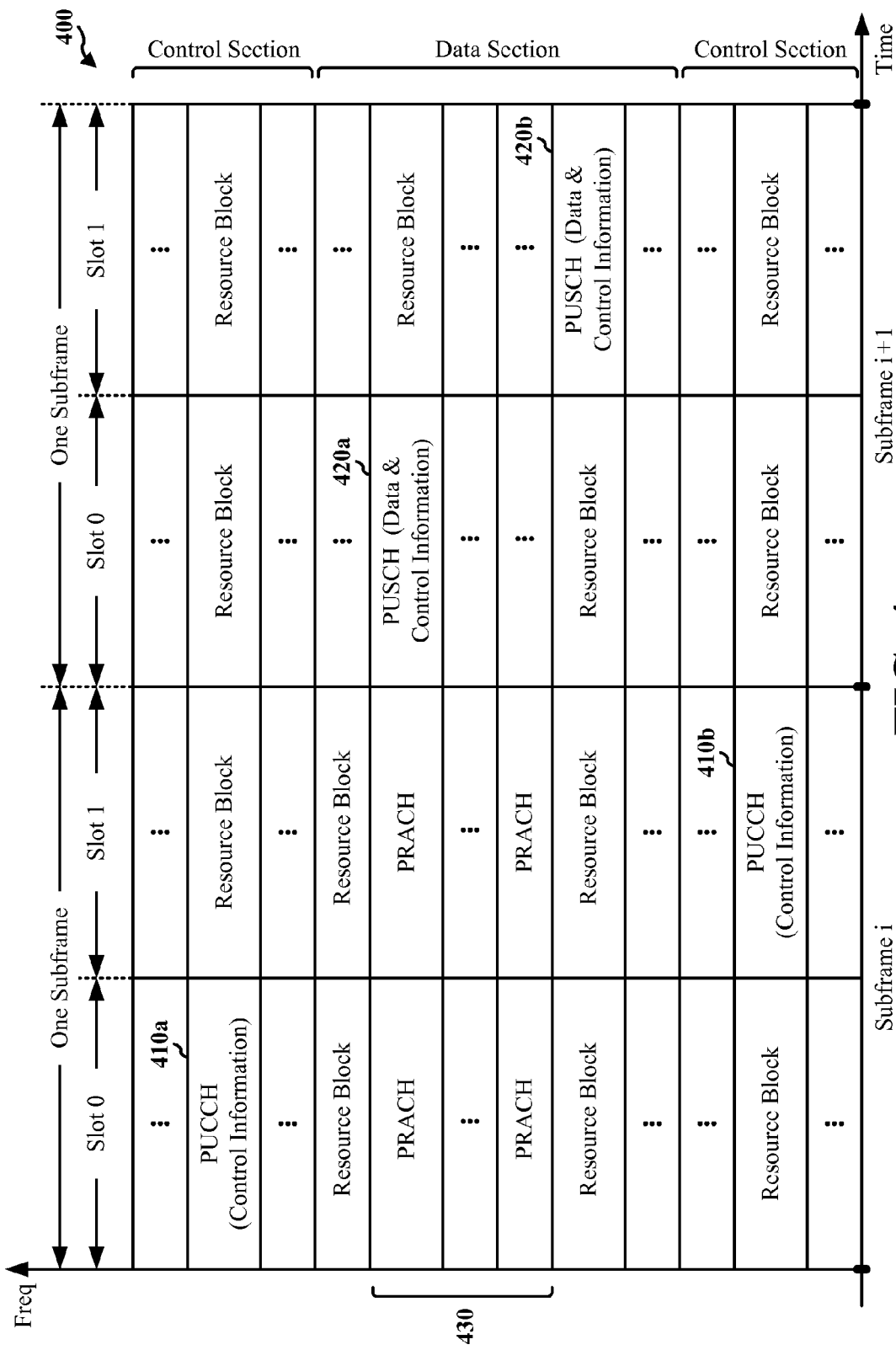
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
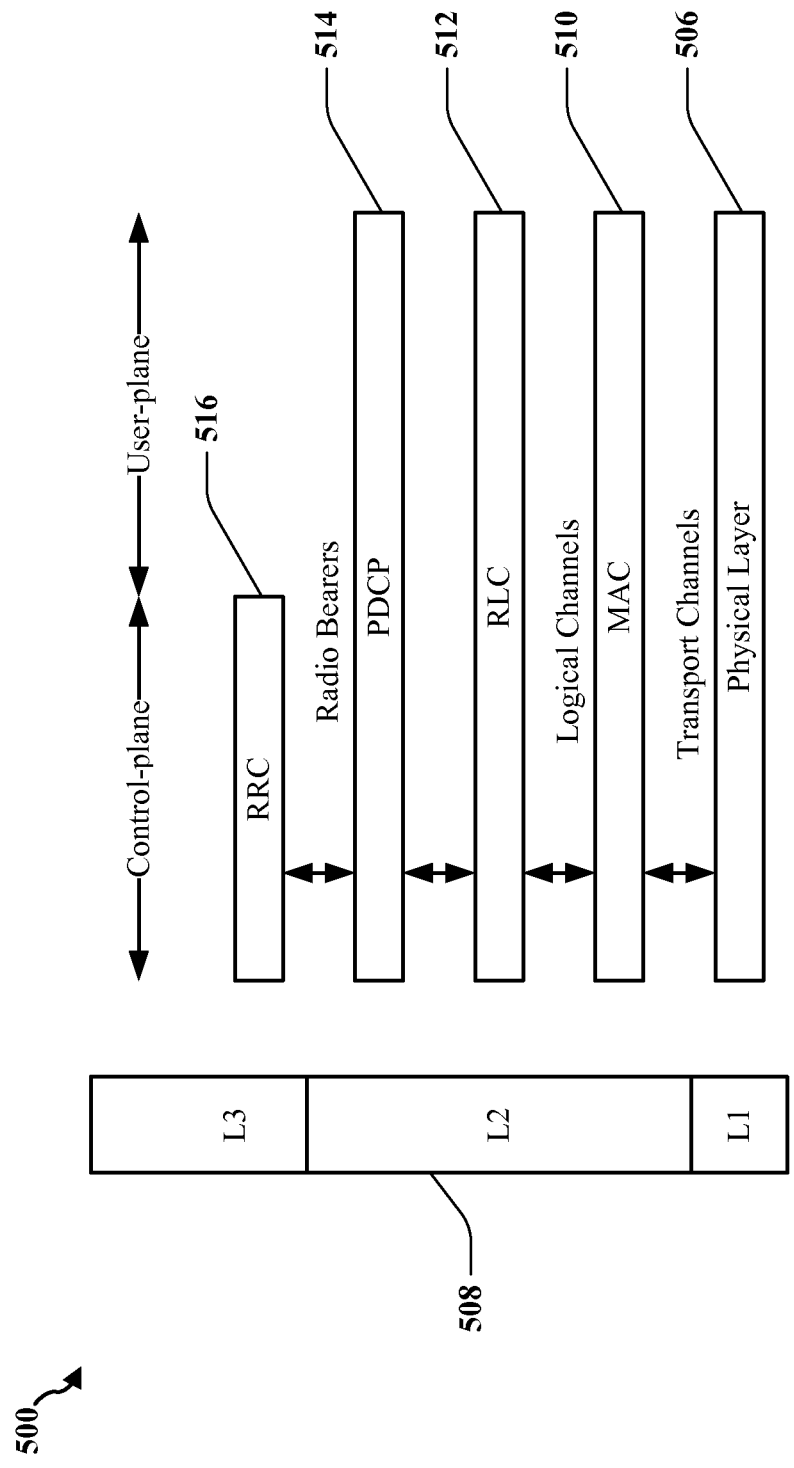
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
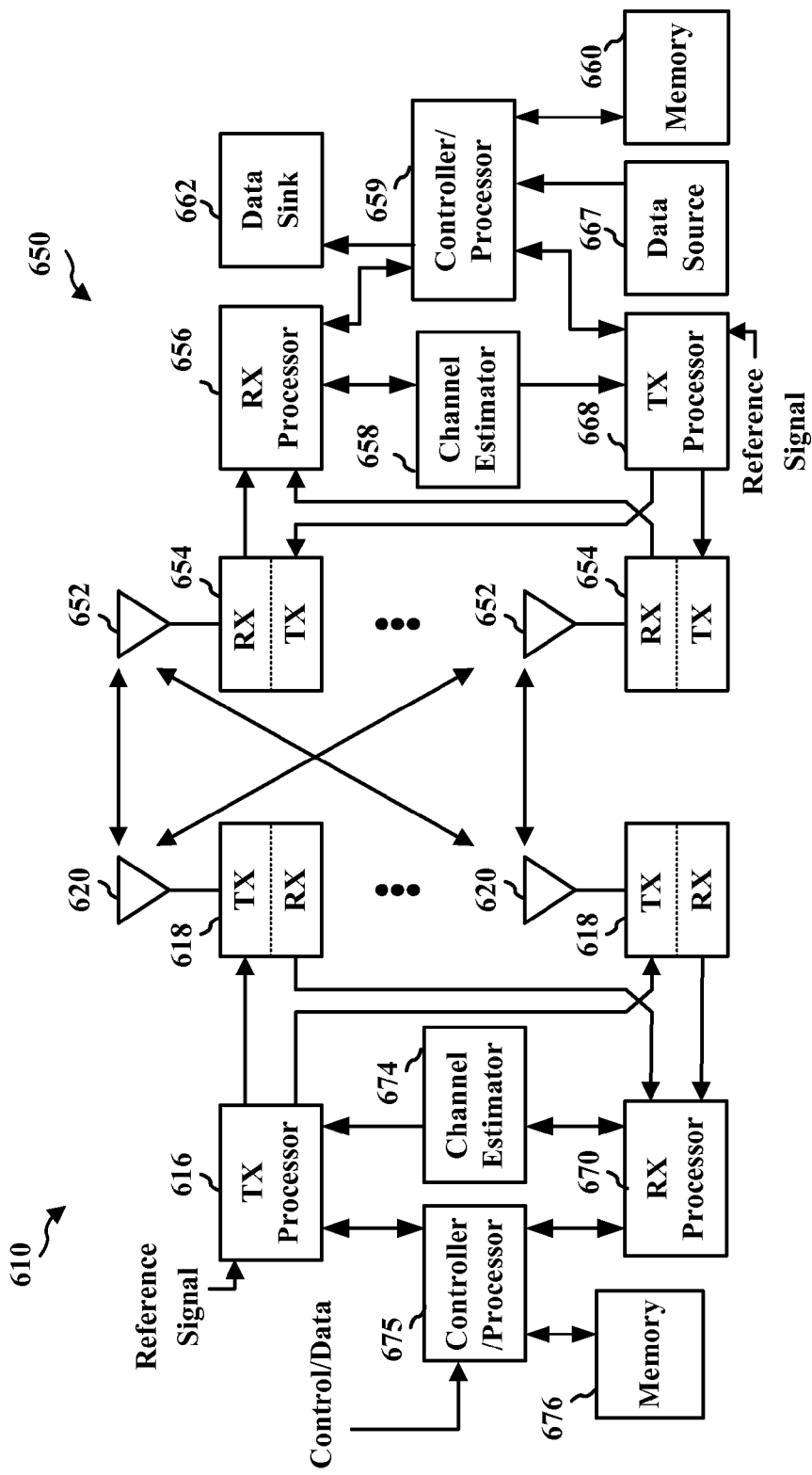
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
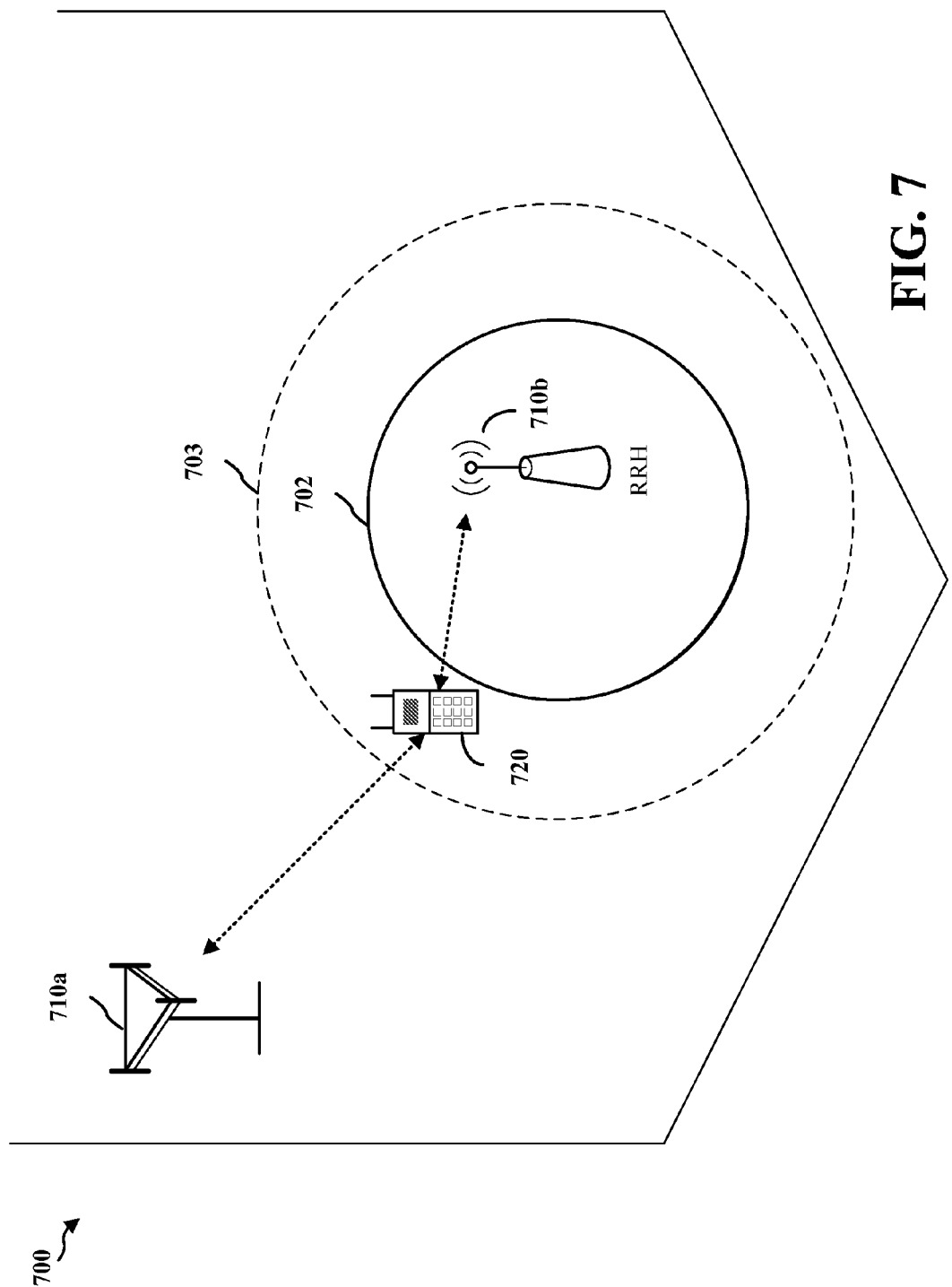
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
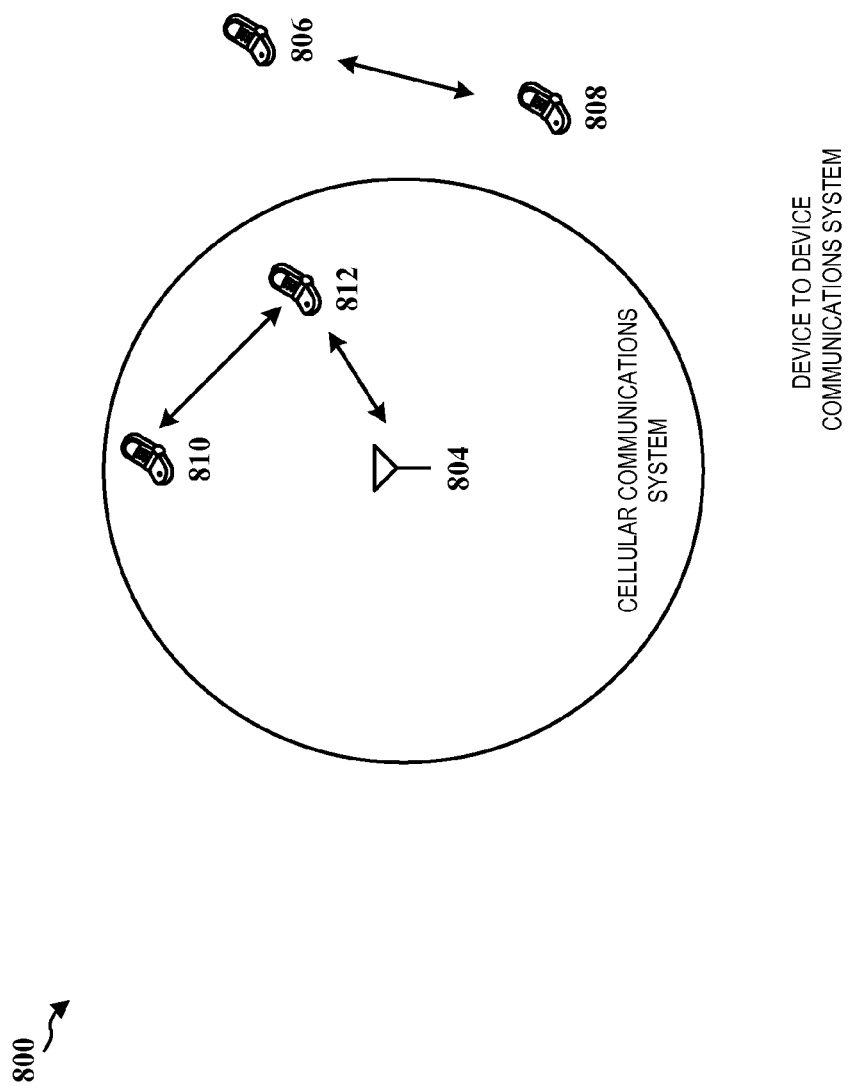
FIG. 8 is a diagram of an exemplary device-to-device (D2D) communications system.

FIG. 8 is a diagram 800 of an exemplary device-to-device (D2D) communications system. The device-to-device communications system 800 includes a plurality of wireless devices 806, 808, 810, 812. The device-to-device communications system 800 may overlap with a cellular communications system, such as for example, a wireless wide area network (WWAN). Some of the wireless devices 806, 808, 810, 812 may communicate together in device-to-device communication, some may communicate with the base station 804, and some may do both. For example, as shown in FIG. 8, the wireless devices 806, 808 are in device-to-device communication and the wireless devices 810, 812 are in device-to-device communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

Figure 9:
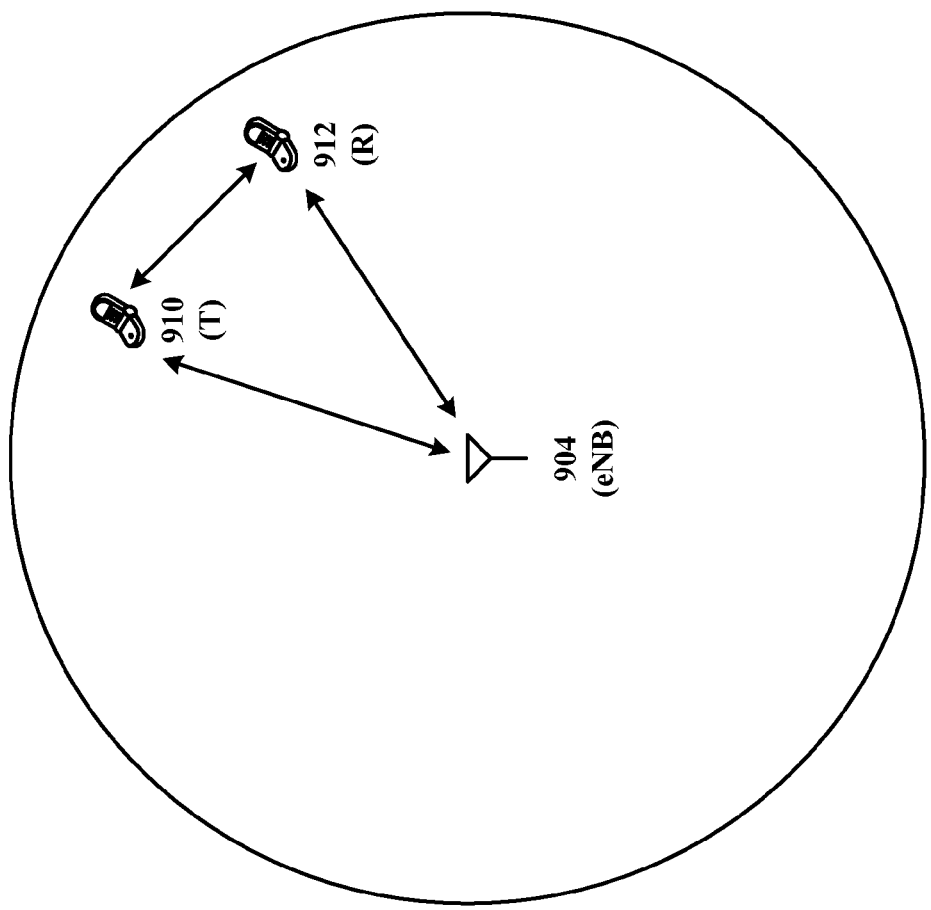
FIG. 9 is a diagram illustrating communication between an eNB and a D2D link.

FIG. 9 is a diagram 900 illustrating communication between an eNB and a D2D link. Referring to FIG. 9, a problem associated with scheduling D2D links in a centralized fashion (e.g., via an eNB) may be observed. To minimize resource assignment overhead, D2D transmissions may follow a synchronous HARQ process. Accordingly, algorithms may be provided for minimizing the overheads of resource assignments, as well as HARQ acknowledgements (ACKs)/negative acknowledgements (NACKs).

Still referring to FIG. 9, a D2D link comprises a transmitter T (910) and a receiver R (912). In order for an eNB 904 to determine when to again schedule a link T-R, the eNB 904 needs to know the success/failure of current (and past) transmissions on the link T-R. Similarly, the transmitter T 910 needs to know the success/failure of the current (and past) transmissions to decide when to stop re-transmitting. Since the transmitter T 910 and the eNB 904 can be at different distances (pathlosses) from the receiver R 912, under a naïve implementation, the receiver R 912 sends ACK/NACK signals in a way to allow both the transmitter T 910 and the eNB 904 to decode the ACK/NACK signals. For example, the ACK/NACK signals may be coded for a weaker channel.

In the present disclosure, design mechanisms are provided to facilitate an exchange of control information to relevant terminals including a D2D link having the transmitter T and the receiver R. For example, selective ACK/NACK reporting may be provided.

Referring to FIG. 9, in selective ACK/NACK reporting, after the receiver R 912 successfully receives data from the transmitter T 910, the receiver R 912 reports ACK only to the eNB 904. If the reception fails, the receiver R 912 reports NACK only to the transmitter T 910. By default, the eNB 904 may assume a failed reception at the receiver R 912 unless the ACK is received. Moreover, the transmitter T 910 may assume a successful reception at the receiver R 912 unless the NACK is received.

In an aspect, the eNB 904 may optionally schedule a D2D link semi-statically. That is, the transmitter T 910 may transmit to the receiver R 912 until further notice. This operation is useful when a D2D link is far away from other links, and does not see or cause much interference. In this case, both ACK and NACK from the receiver R 912 are sent directly over the air to the transmitter T 910, and the involvement of the eNB 904 is limited (e.g., for slow time scale scheduling).

Figure 10:
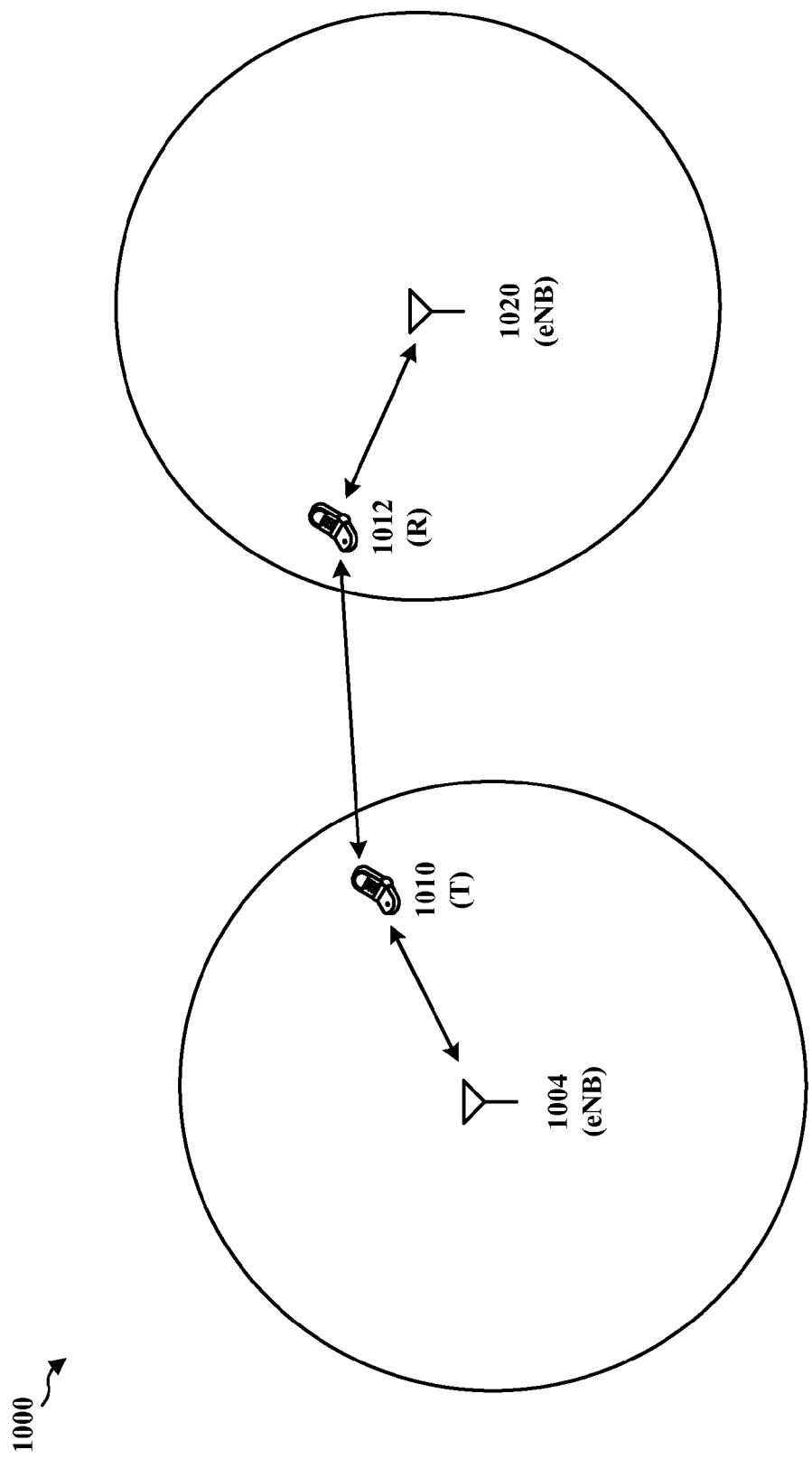
FIG. 10 is a diagram illustrating eNB coordination with respect to a D2D link.

FIG. 10 is a diagram 1000 illustrating eNB coordination with respect to a D2D link. Unlike a wide area network (WAN) traffic scenario, the two UEs of a D2D link (e.g., transmitter T and receiver R) may have two different serving eNBs. For example, referring to FIG. 10, a D2D link comprises a transmitter T 1010 and a receiver R 1012. However, the transmitter T 1010 is served by first serving eNB 1004, and the receiver R 1012 is separately served by second serving eNB 1020. The two serving eNBs (1004, 1020) may simultaneously send resource assignment grants to the transmitter T 1010 and the receiver R 1012, respectively, to schedule a link T-R.

When the link T-R is established, the transmitter T 1010 may send data packets to the receiver R 1012. Upon successful reception of the data packets at the receiver R 1012, the receiver R 1012 may report ACK only to the second serving eNB 1020. In an aspect, the second serving eNB 1020 may then communicate the ACK to the first serving eNB 1004 via an X2 backhaul. If reception of the data packets fails at the receiver R 1012, the receiver R 1012 may report NACK to the transmitter T 1010.

Figure 11:
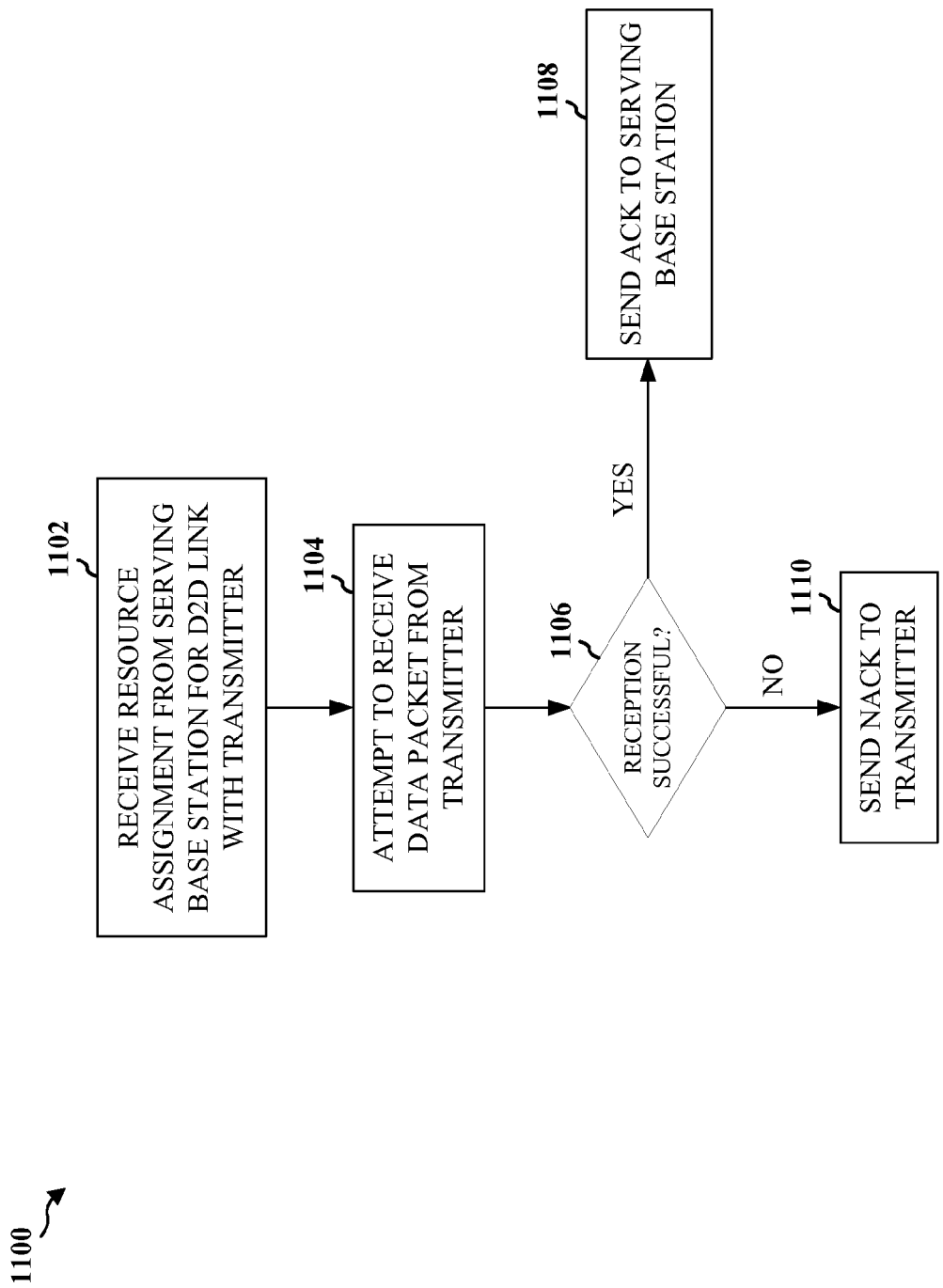
FIG. 11 is a flow chart of a method of wireless communication.

FIG. 11 is a flow chart 1100 of a method of wireless communication. The method may be performed by a UE, such as a receiver UE of a transmitter-receiver (T-R) link. At step 1102, the UE receives a resource assignment from a serving base station for a device-to-device (D2D) link with a transmitter. At step 1104, the UE attempts to receive a data packet from the transmitter based on the resource assignment.

At step 1106, the UE determines whether reception of the data packet is successful. When reception of the data packet succeeds, at step 1108, the UE sends an acknowledgment (ACK) only to the serving base station. However, when reception of the data packet fails, at step 1110, the UE sends a negative acknowledgment (NACK) only to the transmitter. In an aspect, the serving base station may be different from a base station serving the transmitter. Alternatively, the serving base station may be the same base station serving the transmitter.

Figure 12:
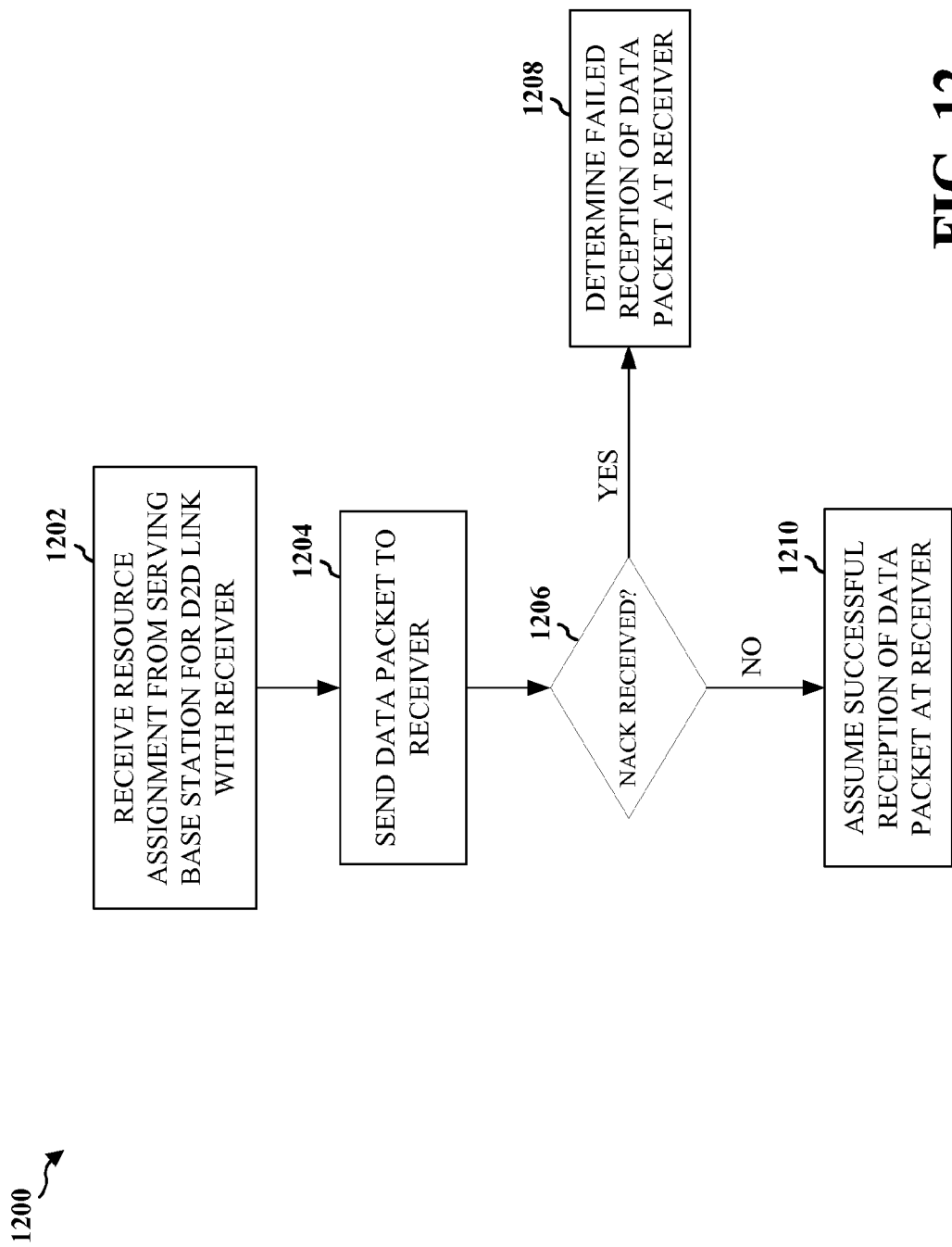
FIG. 12 is a flow chart of a method of wireless communication.

FIG. 12 is a flow chart 1200 of a method of wireless communication. The method may be performed by a UE, such as a transmitter UE of a T-R link. At step 1202, the UE receives a resource assignment from a serving base station for a D2D link with a receiver. At step 1204, the UE sends a data packet to the receiver based on the resource assignment.

At step 1206, the UE determines whether a NACK is received from the receiver. The NACK indicates a failed reception of the data packet. Thus, when the NACK is received from the receiver, at step 1208, the UE determines that the receiver failed to receive the data packet. However, when the NACK is not received from the receiver, at step 1210, the UE assumes that the receiver successfully received the data packet. In an aspect, the serving base station may be different from a base station serving the receiver. Alternatively, the serving base station may be the same base station serving the receiver.

Figure 13:
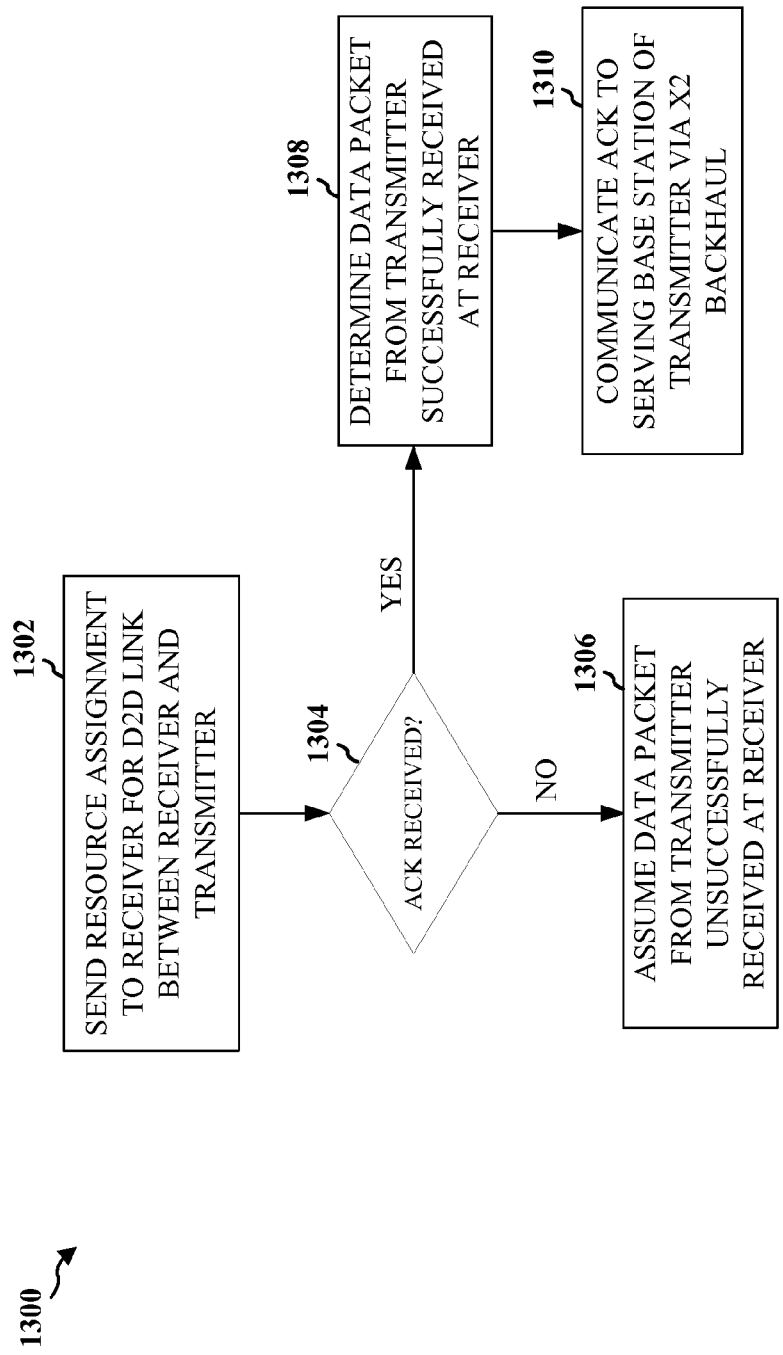
FIG. 13 is a flow chart of a method of wireless communication.

FIG. 13 is a flow chart 1300 of a method of wireless communication. The method may be performed by a serving base station (or eNB) serving a receiver of a transmitter-receiver (T-R) link. At step 1302, the base station sends a resource assignment to a receiver for a device-to-device (D2D) link between the receiver and a transmitter. At step 1304, the base station determines whether an acknowledgment (ACK) is received from the receiver. The ACK indicates a successful reception of a data packet at the receiver.

When the ACK is not received from the receiver, at step 1306, the base station assumes that a data packet sent from the transmitter to the receiver is unsuccessfully received at the receiver. When the ACK is received from the receiver, at step 1308, the base station determines that the data packet sent from the transmitter to the receiver is successfully received at the receiver. Thereafter, at step 1310, the base station communicates the ACK to a serving base station of the transmitter via an X2 backhaul.

Figure 14:
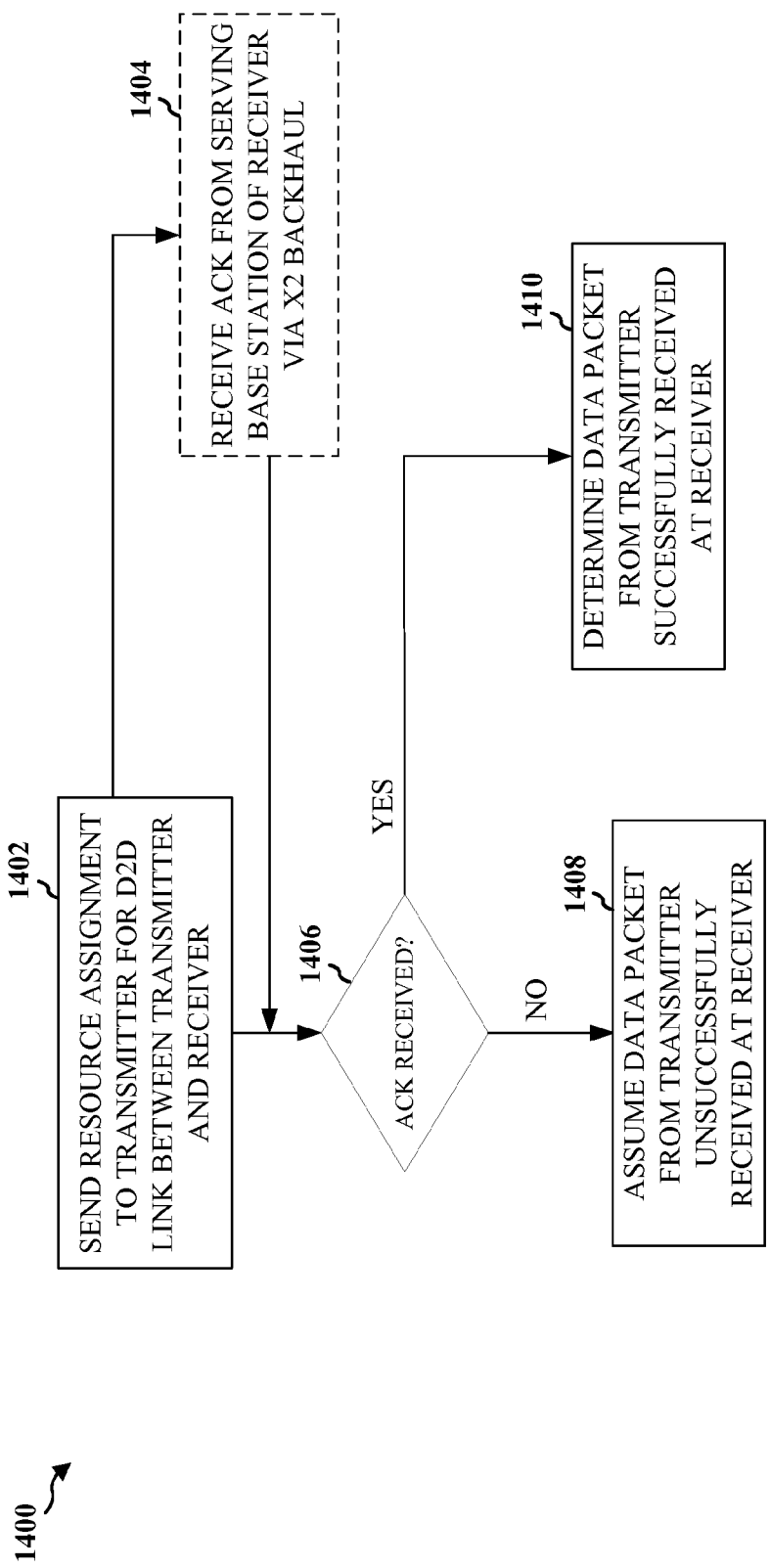
FIG. 14 is a flow chart of a method of wireless communication.

FIG. 14 is a flow chart 1400 of a method of wireless communication. The method may be performed by a serving base station (or eNB) serving a transmitter of a T-R link. At step 1402, the base station sends a resource assignment to a transmitter for a D2D link between the transmitter and a receiver. At step 1404, the base station may optionally receive an ACK from a serving base station of the receiver via an X2 backhaul. The ACK indicates a successful reception of a data packet at the receiver.

At step 1406, the base station determines whether the ACK is received from the serving base station of the receiver. When the ACK is not received from the serving base station of the receiver, at step 1408, the base station assumes that a data packet sent from the transmitter to the receiver is unsuccessfully received at the receiver. When the ACK is received from the serving base station of the receiver, at step 1410, the base station determines that the data packet sent from the transmitter to the receiver is successfully received at the receiver.

Figure 15:
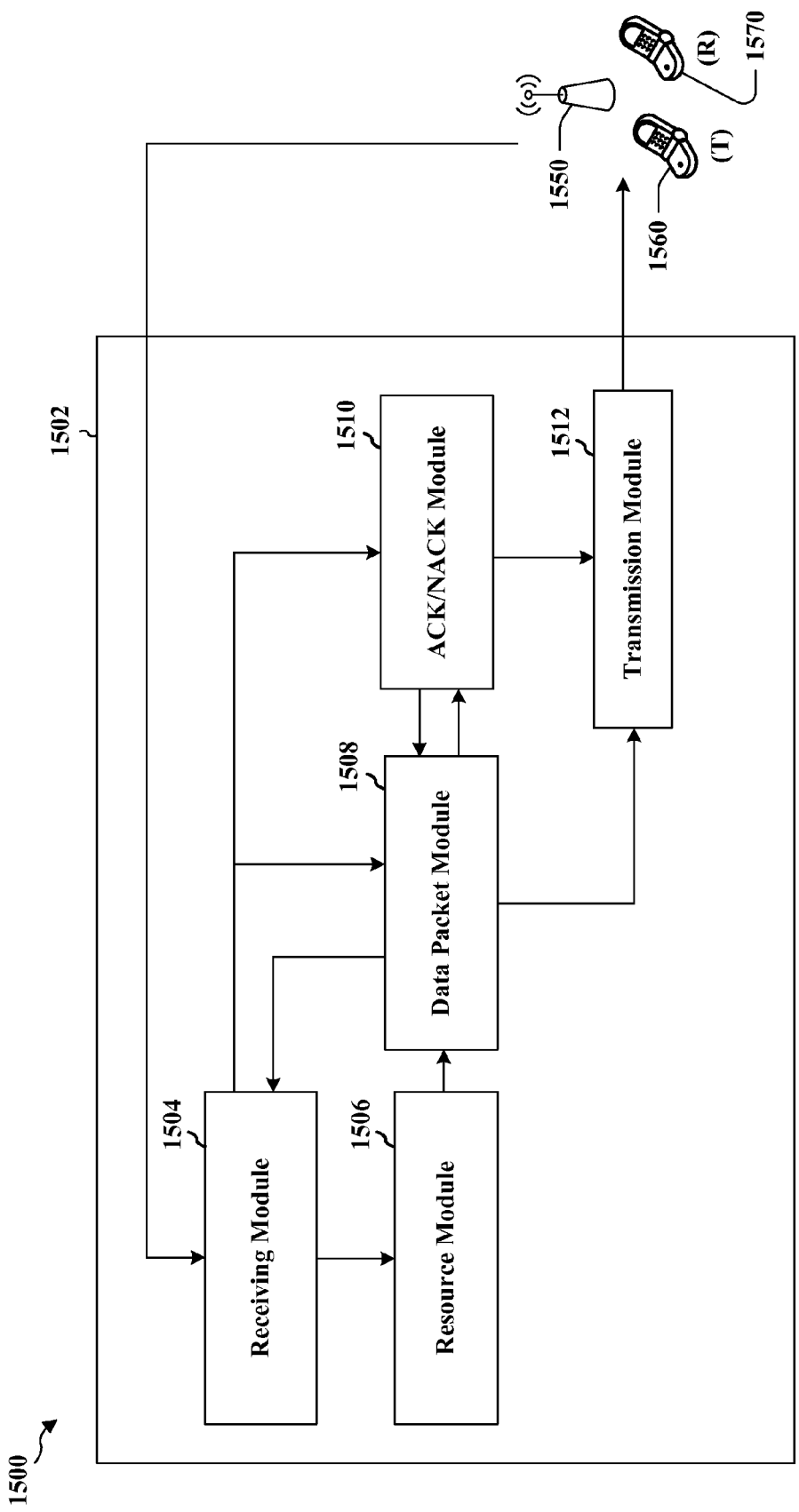
FIG. 15 is a conceptual data flow diagram illustrating the data flow between different modules/means/components in an exemplary apparatus.

FIG. 15 is a conceptual data flow diagram 1200 illustrating the data flow between different modules/means/components in an exemplary apparatus 1502. The apparatus may be a receiver UE or a transmitter UE of a transmitter-receiver (T-R) link. The apparatus includes a receiving module 1504, a resource module 1506, a data packet module 1508, an ACK/NACK module 1510, and a transmission module 1512.

In an aspect, the resource module 1506 receives, via the receiving module 1504, a resource assignment from a serving base station 1550 for a device-to-device (D2D) link with a transmitter 1560. The data packet module 1508 attempts to receive a data packet from the transmitter 1560 based on the resource assignment.

The data packet module 1508 determines whether reception of the data packet is successful. When reception of the data packet succeeds, the ACK/NACK module 1510 sends, via the transmission module 1512, an acknowledgment (ACK) only to the serving base station 1550. However, when reception of the data packet fails, the ACK/NACK module 1510 sends, via the transmission module 1512, a negative acknowledgment (NACK) only to the transmitter 1560. In an aspect, the serving base station 1550 may be different from a base station serving the transmitter 1560. Alternatively, the serving base station 1550 may be the same base station serving the transmitter 1560.

In a further aspect, the resource module 1506 receives, via the receiving module 1504, a resource assignment from a serving base station 1550 for a D2D link with a receiver 1570. The data packet module sends, via the transmission module 1512, a data packet to the receiver 1570 based on the resource assignment.

The ACK/NACK module 1510 determines whether a negative acknowledgment (NACK) is received from the receiver 1570. The NACK indicates a failed reception of the data packet. Thus, when the NACK is received from the receiver 1570, the data packet module 1508 determines that the receiver 1570 failed to receive the data packet. However, when the NACK is not received from the receiver 1570, the data packet module 1508 assumes that the receiver 1570 successfully received the data packet. In an aspect, the serving base station 1550 may be different from a base station serving the receiver 1570. Alternatively, the serving base station 1550 may be the same base station serving the receiver 1570.

Figure 16:
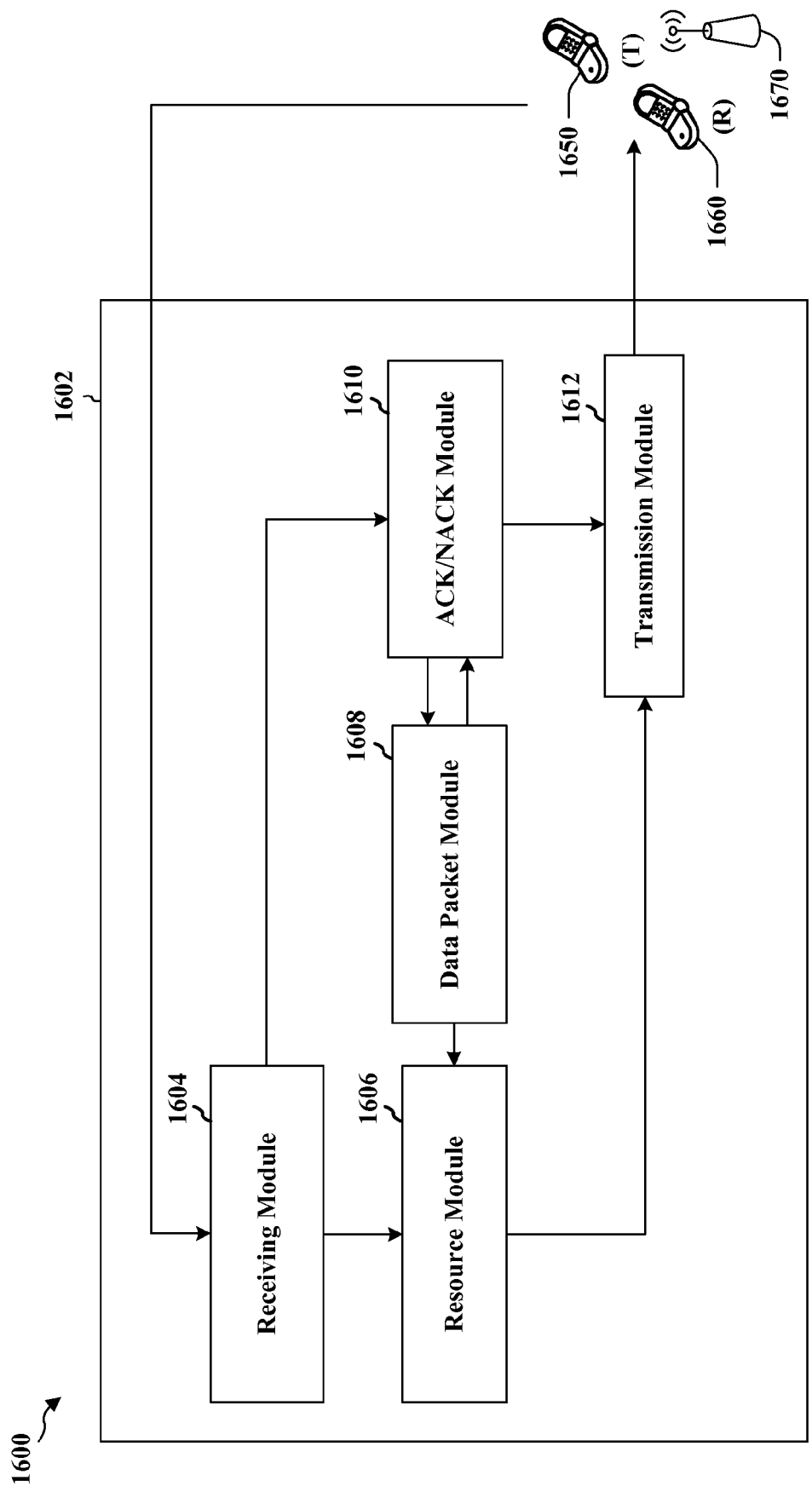
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus may be a serving base station (or eNB) serving a transmitter or receiver of a transmitter-receiver (T-R) link. The apparatus includes a receiving module 1604, a resource module 1606, a data packet module 1608, an ACK/NACK module 1610, and a transmission module 1612.

In an aspect, the resource module 1606 sends, via the transmission module 1612, a resource assignment to a receiver 1660 for a device-to-device (D2D) link between the receiver 1660 and a transmitter 1650. The ACK/NACK module 1610 determines whether an acknowledgment (ACK) is received from the receiver 1660. The ACK indicates a successful reception of a data packet at the receiver 1660.

When the ACK is not received from the receiver 1660, the data packet module 1608 assumes that a data packet sent from the transmitter 1650 to the receiver 1660 is unsuccessfully received at the receiver 1660. When the ACK is received by the ACK/NACK module 1610 from the receiver 1660 via the receiving module 1604, the data packet module 1608 determines that the data packet sent from the transmitter 1650 to the receiver 1660 is successfully received at the receiver 1660. Thereafter, the ACK/NACK module 1610 communicates the ACK to a serving base station 1670 of the transmitter 1650 via an X2 backhaul.

In a further aspect, the resource module 1606 sends, via the transmission module 1612, a resource assignment to a transmitter 1650 for a D2D link between the transmitter 1650 and a receiver 1660. The ACK/NACK module 1610 may optionally receive an ACK from a serving base station 1670 of the receiver 1660 via an X2 backhaul. The ACK indicates a successful reception of a data packet at the receiver 1660.

The ACK/NACK module 1610 determines whether the ACK is received from the serving base station 1670 of the receiver 1660. When the ACK is not received from the serving base station 1670 of the receiver 1660, the data packet module 1608 assumes that a data packet sent from the transmitter 1650 to the receiver 1660 is unsuccessfully received at the receiver 1660. When the ACK is received from the serving base station 1670 of the receiver 1660 via the receiving module 1604, the data packet module 1608 determines that the data packet sent from the transmitter 1650 to the receiver 1660 is successfully received at the receiver 1660.

The apparatus may include additional modules that perform each of the steps of the algorithm in the aforementioned flow charts of FIGS. 11-14. As such, each step in the aforementioned flow charts of FIGS. 11-14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
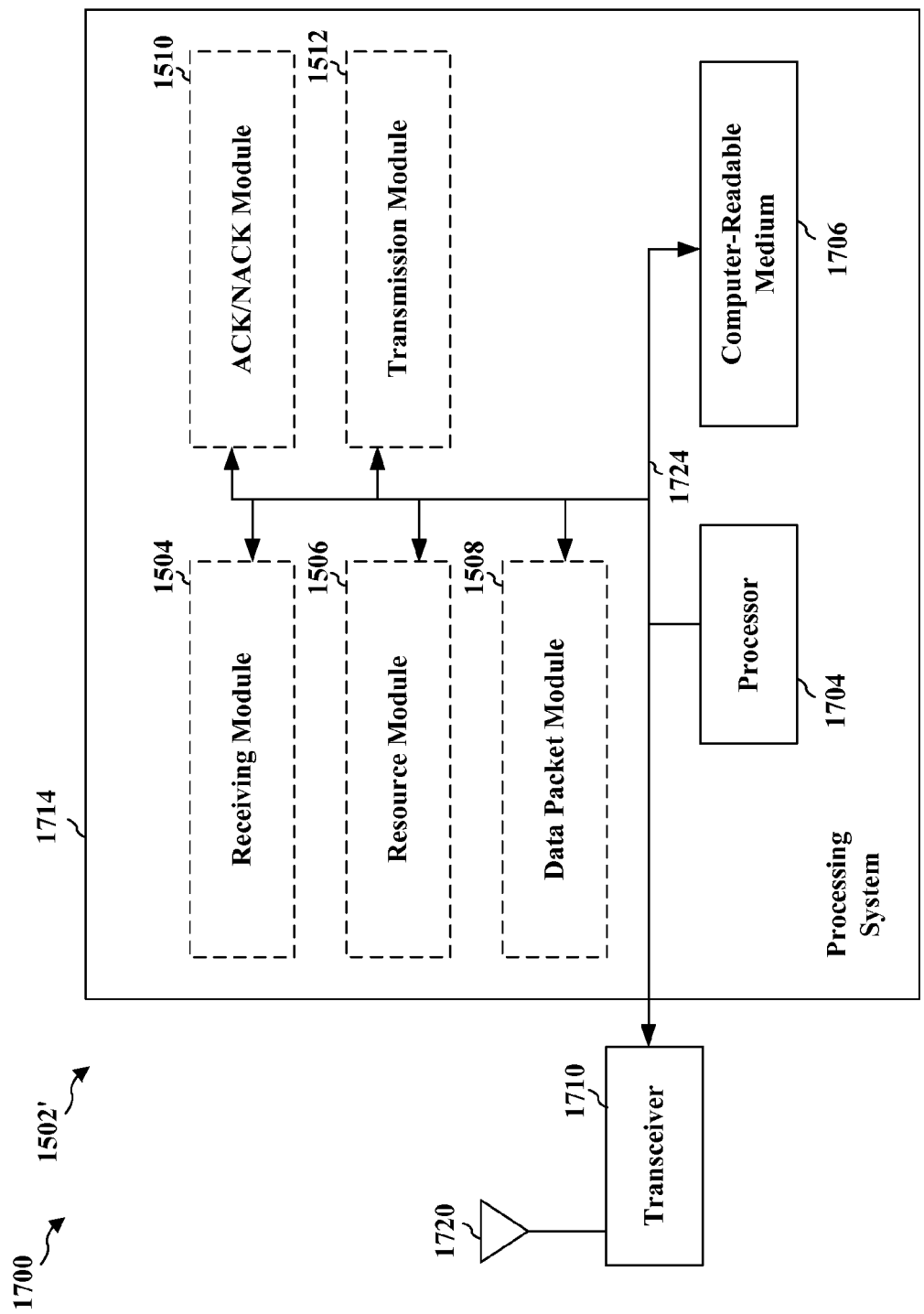
FIG. 17 is a diagram illustrating an example of a hardware implementation for an apparatus employing a processing system.

FIG. 17 is a diagram 1700 illustrating an example of a hardware implementation for an apparatus 1502' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1504, 1506, 1508, 1510, 1512 and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1504, 1506, 1508, 1510, and 1512. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1502/1502' for wireless communication includes means for receiving a resource assignment from a serving base station for a device-to-device (D2D) link with a transmitter, means for attempting to receive a data packet from the transmitter based on the resource assignment, means for sending an acknowledgment (ACK) only to the serving base station when reception of the data packet succeeds, means for sending a negative acknowledgment (NACK) only to the transmitter when the reception of the data packet fails, means for receiving a resource assignment from a serving base station for a device-to-device (D2D) link with a receiver, means for sending a data packet to the receiver based on the resource assignment, and means for assuming the data packet is successfully received at the receiver unless a NACK is received from the receiver, wherein the NACK indicates a failed reception of the data packet at the receiver.

The aforementioned means may be one or more of the aforementioned modules of the apparatus 1502 and/or the processing system 1714 of the apparatus 1502' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 18:
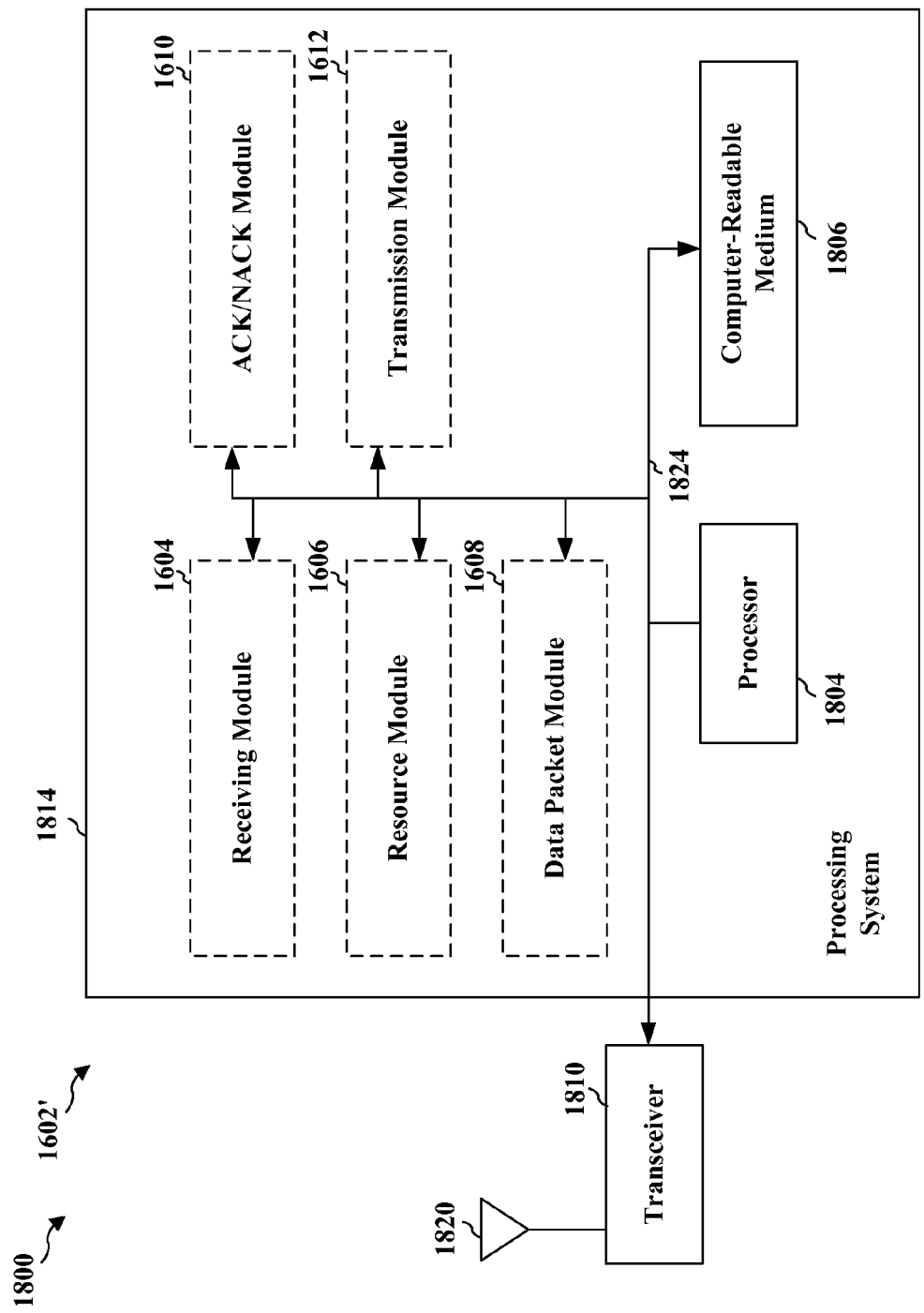
FIG. 18 is a diagram illustrating an example of a hardware implementation for an apparatus employing a processing system.

FIG. 18 is a diagram 1800 illustrating an example of a hardware implementation for an apparatus 1602' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1604, 1606, 1608, 1610, 1612 and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1604, 1606, 1608, 1610, and 1612. The modules may be software modules running in the processor 1804, resident/stored in the computer readable medium 1806, one or more hardware modules coupled to the processor 1804, or some combination thereof. The processing system 1814 may be a component of the eNB 610 and may include the memory 676 and/or at least one of the TX processor 616, the RX processor 670, and the controller/processor 675.

In one configuration, the apparatus 1602/1602' for wireless communication includes means for sending a resource assignment to a receiver for a device-to-device (D2D) link between the receiver and a transmitter, means for assuming a data packet sent from the transmitter is unsuccessfully received at the receiver unless an acknowledgment (ACK) is received from the receiver, wherein the ACK indicates a successful reception of the data packet at the receiver, means for receiving the ACK from the receiver, means for communicating the ACK to a serving base station of the transmitter via an X2 backhaul when the ACK is received from the receiver, means for sending a resource assignment to a transmitter for a D2D link between the transmitter and a receiver, means for assuming a data packet sent from the transmitter is unsuccessfully received at the receiver unless an ACK is received from a serving base station of the receiver, wherein the ACK indicates a successful reception of the data packet at the receiver, means for receiving the ACK from the serving base station of the receiver via an X2 backhaul.

The aforementioned means may be one or more of the aforementioned modules of the apparatus 1602 and/or the processing system 1814 of the apparatus 1602' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a receiver, a resource assignment from a serving base station for a device-to-device (D2D) link with a transmitter;
attempting, by the receiver, reception of a data packet from the transmitter based on the resource assignment;
sending, by the receiver, an acknowledgment (ACK) only to the serving base station when the reception of the data packet from the transmitter succeeds; and
sending, by the receiver, a negative acknowledgment (NACK) only to the transmitter when the reception of the data packet from the transmitter fails.

2. The method of claim 1, wherein the serving base station is different from a base station serving the transmitter.

3. The method of claim 1, wherein the serving base station is a same base station serving the transmitter.

4. A method of wireless communication, comprising:
receiving, by a transmitter, a resource assignment from a serving base station for a device-to-device (D2D) link with a receiver;
sending, by the transmitter, a data packet to the receiver based on the resource assignment; and
assuming, by the transmitter, the data packet is successfully received at the receiver unless a negative acknowledgment (NACK) is received from the receiver, wherein the NACK indicates a failed reception of the data packet at the receiver, and
wherein the serving base station of the transmitter is different from a base station serving the receiver.

5. A method of wireless communication, comprising:
sending, by a serving base station of a receiver, a resource assignment to the receiver for a device-to-device (D2D) link between the receiver and a transmitter;
assuming, by the serving base station of the receiver, a data packet sent from the transmitter in the D2D link is unsuccessfully received at the receiver unless an acknowledgment (ACK) is received from the receiver, wherein the ACK indicates a successful reception of the data packet at the receiver;
receiving, by the serving base station of the receiver, the ACK from the receiver; and
communicating, by the serving base station of the receiver, the ACK to a serving base station of the transmitter when the ACK is received from the receiver.

6. The method of claim 5, wherein the ACK is communicated to the serving base station of the transmitter via an X2 backhaul when the ACK is received from the receiver.

7. A method of wireless communication, comprising:
sending, by a serving base station of a transmitter, a resource assignment to the transmitter for a device-to-device (D2D) link between the transmitter and a receiver; and
assuming, by the serving base station of the transmitter, a data packet sent from the transmitter in the D2D link is unsuccessfully received at the receiver unless an acknowledgment (ACK) is received at the serving base station of the transmitter from a serving base station of the receiver,
wherein the ACK indicates a successful reception of the data packet at the receiver.

8. The method of claim 7, further comprising:
receiving, by the serving base station of the transmitter, the ACK from the serving base station of the receiver via an X2 backhaul.

9. An apparatus for wireless communication, comprising:
means for receiving a resource assignment from a serving base station for a device-to-device (D2D) link with a transmitter;
means for attempting reception of a data packet from the transmitter based on the resource assignment;
means for sending an acknowledgment (ACK) only to the serving base station when the reception of the data packet from the transmitter succeeds; and
means for sending a negative acknowledgment (NACK) only to the transmitter when the reception of the data packet from the transmitter fails.

10. The apparatus of claim 9, wherein the serving base station is different from a base station serving the transmitter.

11. The apparatus of claim 9, wherein the serving base station is a same base station serving the transmitter.

12. An apparatus for wireless communication, comprising:
means for receiving, by the apparatus, a resource assignment from a serving base station for a device-to-device (D2D) link with a receiver;
means for sending, by the apparatus, a data packet to the receiver based on the resource assignment; and means for assuming, by the apparatus, the data packet is successfully received at the receiver unless a negative acknowledgment (NACK) is received from the receiver,
wherein the NACK indicates a failed reception of the data packet at the receiver, and
wherein the serving base station of the apparatus is different from a base station serving the receiver.

13. A base station for wireless communication, comprising:
means for sending a resource assignment to a receiver served by the base station for a device-to-device (D2D) link between the receiver and a transmitter;
means for assuming a data packet sent from the transmitter in the D2D link is unsuccessfully received at the receiver unless an acknowledgment (ACK) is received from the receiver,
wherein the ACK indicates a successful reception of the data packet at the receiver;
means for receiving the ACK from the receiver; and
means for communicating the ACK to a serving base station of the transmitter when the ACK is received from the receiver.

14. The base station of claim 13, wherein the ACK is communicated to the serving base station of the transmitter via an X2 backhaul when the ACK is received from the receiver.

15. A base station for wireless communication, comprising:
means for sending a resource assignment to a transmitter served by the base station for a device-to-device (D2D) link between the transmitter and a receiver; and
means for assuming a data packet sent from the transmitter in the D2D link is unsuccessfully received at the receiver unless an acknowledgment (ACK) is received at the base station from a serving base station of the receiver,
wherein the ACK indicates a successful reception of the data packet at the receiver.

16. The base station of claim 15, further comprising:
means for receiving the ACK from the serving base station of the receiver via an X2 backhaul.

17. An apparatus for wireless communication, comprising:
a processing system configured to:
receive a resource assignment from a serving base station for a device-to-device (D2D) link with a transmitter;
attempt reception of a data packet from the transmitter based on the resource assignment;
send an acknowledgment (ACK) only to the serving base station when the reception of the data packet from the transmitter succeeds; and
send a negative acknowledgment (NACK) only to the transmitter when the reception of the data packet from the transmitter fails.

18. The apparatus of claim 17, wherein the serving base station is different from a base station serving the transmitter.

19. The apparatus of claim 17, wherein the serving base station is a same base station serving the transmitter.

20. An apparatus for wireless communication, comprising:
a processing system configured to:
receive, by the apparatus, a resource assignment from a serving base station for a device-to-device (D2D) link with a receiver;
send, by the apparatus, a data packet to the receiver based on the resource assignment; and
assume, by the apparatus, the data packet is successfully received at the receiver unless a negative acknowledgment (NACK) is received from the receiver,
wherein the NACK indicates a failed reception of the data packet at the receiver, and
wherein the serving base station of the apparatus is different from a base station serving the receiver.

21. A base station for wireless communication, comprising:
a processing system configured to:
send a resource assignment to a receiver served by the base station for a device-to-device (D2D) link between the receiver and a transmitter;
assume a data packet sent from the transmitter in the D2D link is unsuccessfully received at the receiver unless an acknowledgment (ACK) is received from the receiver,
wherein the ACK indicates a successful reception of the data packet at the receiver;
receive the ACK from the receiver; and
communicate the ACK to a serving base station of the transmitter when the ACK is received from the receiver.

22. The base station of claim 21, wherein the ACK is communicated to the serving base station of the transmitter via an X2 backhaul when the ACK is received from the receiver.

23. A base station for wireless communication, comprising:
a processing system configured to:
send a resource assignment to a transmitter served by the base station for a device-to-device (D2D) link between the transmitter and a receiver; and
assume a data packet sent from the transmitter in the D2D link is unsuccessfully received at the receiver unless an acknowledgment (ACK) is received at the base station from a serving base station of the receiver,
wherein the ACK indicates a successful reception of the data packet at the receiver.

24. The base station of claim 23, the processing system further configured to:
receive the ACK from the serving base station of the receiver via an X2 backhaul.

25. A computer program product, comprising:
a non-transitory computer-readable medium comprising code for:
receiving, by a receiver, a resource assignment from a serving base station for a device-to-device (D2D) link with a transmitter;
attempting, by the receiver, reception of a data packet from the transmitter based on the resource assignment;
sending, by the receiver, an acknowledgment (ACK) only to the serving base station when the reception of the data packet from the transmitter succeeds; and
sending, by the receiver, a negative acknowledgment (NACK) only to the transmitter when the reception of the data packet from the transmitter fails.

26. The computer program product of claim 25, wherein the serving base station is different from a base station serving the transmitter.

27. The computer program product of claim 25, wherein the serving base station is a same base station serving the transmitter.

28. A computer program product, comprising:
a non-transitory computer-readable medium comprising code for:
receiving, by a transmitter, a resource assignment from a serving base station for a device-to-device (D2D) link with a receiver;
sending, by the transmitter, a data packet to the receiver based on the resource assignment; and assuming, by the transmitter, the data packet is successfully received at the receiver unless a negative acknowledgment (NACK) is received from the receiver, wherein the NACK indicates a failed reception of the data packet at the receiver, and wherein the serving base station of the transmitter is different from a base station serving the receiver.

29. A computer program product, comprising:

a non-transitory computer-readable medium comprising code for:

sending, by a serving base station of a receiver, a resource assignment to the receiver for a device-to-device (D2D) link between the receiver and a transmitter;

assuming, by the serving base station of the receiver, a data packet sent from the transmitter in the D2D link is unsuccessfully received at the receiver unless an acknowledgment (ACK) is received from the receiver, wherein the ACK indicates a successful reception of the data packet at the receiver;

receiving, by the serving base station of the receiver, the ACK from the receiver; and communicating, by the serving base station of the receiver, the ACK to a serving base station of the transmitter when the ACK is received from the receiver.

30. The computer program product of claim 29, wherein the ACK is communicated to the serving base station of the transmitter via an X2 backhaul when the ACK is received from the receiver.

31. A computer program product, comprising:

a non-transitory computer-readable medium comprising code for:

sending, by a serving base station of a transmitter, a resource assignment to the transmitter for a device-to-device (D2D) link between the transmitter and a receiver; and assuming, by the serving base station of the transmitter, a data packet sent from the transmitter in the D2D link is unsuccessfully received at the receiver unless an acknowledgment (ACK) is received at the serving base station of the transmitter from a serving base station of the receiver, wherein the ACK indicates a successful reception of the data packet at the receiver.

32. The computer program product of claim 31, the non-transitory computer-readable medium further comprising code for:

receiving, by the serving base station of the transmitter, the ACK from the serving base station of the receiver via an X2 backhaul.

* * * * *